United States Patent Office 3,194,803
Patented July 13, 1965

---

3,194,803
PROCESS AND INTERMEDIATES FOR THE MANUFACTURE OF 3-KETO-$\Delta^{4,6}$ STEROIDS
Frank B. Colton, Chicago, Ill., assignor to G. D. Searle & Co., Chicago, Ill., a corporation of Delaware
No Drawing. Filed Apr. 28, 1960, Ser. No. 25,231
13 Claims. (Cl. 260—239.57)

This application is a continuation-in-part of my copending application, Serial No. 792,984, filed February 13, 1959, now U.S. Pat. No. 2,946,809.

The present invention is concerned with a novel process for the production of 3-keto-$\Delta^{4,6}$ steroids and also with novel intermediates in the manufacture thereof. By the instant process, compounds of the structural formula

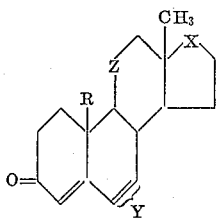

wherein R is selected from the group consisting of hydrogen and methyl radicals; X is selected from the group consisting of

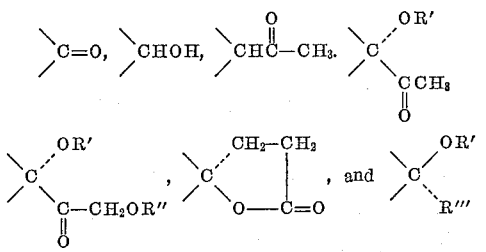

radicals; Y is selected from the group consisting of hydrogen, halogens of atomic weight less than 100, and methyl radicals attached alternatively to carbon atom 6 or 7; Z is a member of the class consisting of methylene, carbonyl, and hydroxymethylene groups; R' and R'' being members of the class consisting of hydrogen and lower alkanoyl radicals and R''' being a member of the class consisting of hydrogen, lower alkyl, lower 1-alkenyl, and lower 1-alkynyl radicals; are produced by reaction of manganese dioxide with compounds of the structural formula

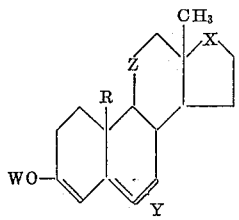

wherein W is a lower alkyl or a lower alkanoyl radical and X, Y, Z, and R are as defined supra.

The halogens encompassed by the Y term are exemplified by chlorine, fluorine, and bromine.

Lower alkanoyl radicals represented by R', R'', and W are, typically, formyl, acetyl, propionyl, butyryl, valeryl, caproyl, and the branched-chain isomers thereof, said groups being the acyl radicals of alkanoic acids containing fewer than 7 carbon atoms. Examples of lower 1-alkynyl radicals included in the R''' term are ethynyl, propynyl, butynyl, pentynyl, hexynyl, and the branched-chain isomers thereof. The lower alkyl radicals encompassed by the W and R''' terms are, for example, methyl, ethyl, propyl, butyl, pentyl, hexyl, and the branched-chain isomers thereof. Lower 1-alkenyl radicals encompassed by R''' are exemplified by vinyl, propenyl, butenyl, pentenyl, hexenyl, and the branched-chain isomers thereof.

The manganese dioxide reagent utilized in the process of this invention is preferably prepared by the special procedure described below:

An aqueous solution of manganous sulfate is heated on a steam bath and an alkali metal permanganate, typically potassium permanganate, is slowly added until the presence of a small excess is made evident by the fact that a purple color persists for 15 minutes. The mixture is then filtered and the precipitate is thoroughly washed with water. The manganese dioxide formed is not washed with an organic solvent as is frequently suggested in the literature, but is rather dried at 70° for several hours. In this condition it is found to be highly active in the conduct of the instant process, thus resulting in high yields of the desired 4,6-dien-3-ones.

In consequence of the aforementioned unusually high order of activity of the manganese dioxide reagent used, the instant process can be conducted at much lower temperatures and for much shorter reaction times than other processes suitable for the manufacture of 3-keto-$\Delta^{4,6}$ steroids. Ordinary room temperature, i.e. 15–30°, is the preferred operating range although temperatures of 10–60° are suitable, and the reaction time can vary from 15 minutes to 2 hours.

Inert organic solvents are in general suitable for use in the instant manganese dioxide oxidation procedure. In the preferred conduct of this method, however, it has been found that a polar organic solvent medium such as an aqueous alkanoic acid solution is particularly suitable when the intermediate is an enol ester, whereas the use of a nonpolar organic solvent such as benzene, toluene, xylene, methylene chloride, carbon tetrachloride, etc., is advantageous in the case where an enol ether is the substrate.

Another oxidizing agent suitable for use in the manufacture of the instant 4,6-dien-3-ones is chloranil. It has also been determined that enamines of 3-keto steroids, as represented by the partial structural formula

can be converted to 3-keto-$\Delta^{4,6}$ steroids by oxidation with manganese dioxide.

The 3-keto-$\Delta^{4,6}$ steroids obtained by the instant process are useful in consequence of their valuable pharmacological properties. Specifically, the 17-oxygenated androstadienes and estradienes (19-norandrostadienes) are androgenic and anabolic agents; the progesterone derivatives are progestational agents; the 21-oxygenated progesterone derivatives are anti-inflammatory agents; the compounds containing a 17-spirolactone substituent are desoxycorticosterone acetate inhibitors; and the 17-oxygenated 17-alkynyl and 17-oxygenated 17-alkenyl derivatives are progestational agents.

Also encompassed by the present invention are novel enol ethers and enol esters which are utilized as intermediates in the conduct of the instant process. The compounds of the structural formula

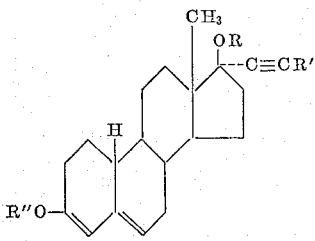

wherein R is a lower alkanoyl radical, R' is a lower alkyl radical and R'' is a lower alkyl or lower alkanoyl radical are useful also as progestational agents and as antihallucinatory agents as evidenced by their ability to inhibit the delusion-producing activity of lysergic acid diethylamide, and are particularly advantageous due to their long-acting properties.

The enol ethers of the structural formula

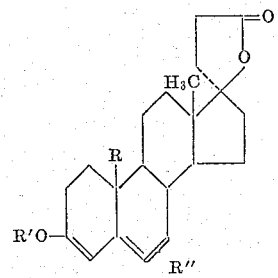

wherein R is hydrogen or a methyl radical, R' is a lower alkyl radical, and R'' is hydrogen or a methyl radical alternatively attached to carbon atom 6 or 7, are useful also as progestational and desoxycorticosterone acetate inhibitory agents possessing activity of prolonged duration.

On the other hand, the enol ethers of structural formula

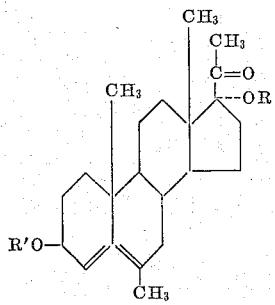

are particularly useful as long-acting progestational agents.

The instant enol ethers are conveniently prepared by methods well-known to those skilled in the art, for example: (1) treatment of the 4-en-3-one with an orthoformic ester, (2) reaction of the 4-en-3-one with the appropriate alcohol utilizing a suitable carrier such as isooctane for the azeotropic removal of the water formed, and (3) transetherification of a preformed alkyl ether, prepared by method (1) or (2), with the appropriate alcohol in the presence of an acid catalyst. A typical preparation is the reaction of 17α-(2-carboxyethyl)-17β-hydroxyandrost-4-en-3-one lactone with ethylorthoformate and ethanol in the presence of p-toluenesulfonic acid to afford 17α-(2-carboxyethyl) - 3 - ethoxy - 17β - hydroxyandrosta-3,5-diene lactone.

The enol esters of this invention can be manufactured by treating the aforementioned 4-en-3-ones with an alkanoic acid anhydride in the presence of a strong acid catalyst. In the case of enol acetates, isopropenyl acetate is a particularly suitable reagent. As a specific example, 17α-(1-butynyl)-17β-hydroxyestr-4-en-3-one is allowed to react with isopropenyl acetate in the presence of concentrated sulfuric acid to afford 3,17β-diacetoxy-17α-(1-butynyl) estra-3,5-diene.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a solution of 20.5 parts of 17α-(2-carboxyethyl)-17β-hydroxyandrost-4-en-3-one lactone and 19.7 parts of ethylorthoformate in 115 parts of dioxane and 5.6 parts of ethanol is added 0.22 part of p-toluenesulfonic acid monohydrate, and the resulting mixture is stored at room temperature for about one and one-half hours. The reaction mixture is neutralized by the addition of about 0.3 part of fused sodium acetate, then evaporated to dryness in vacuo. Trituration of the residue with methanol results in crystallization of 17α-(2-carboxyethyl)-3-ethoxy-17β-hydroxyandrosta-3,5-diene lactone, M.P. about 163–170°. Recrystallization first from benzene-pentane then from acetone affords the pure product, M.P. about 170–175°.

*Example 2*

To a solution of 1.9 parts of 17α-(2-carxoxyethyl)-3-ethoxy-17β-hydroxyandrosta-3,5-diene lactone in 132 parts of benzene is added 10 parts of manganese dioxide, and the resulting mixture is stirred at room temperature for about 25 minutes, then filtered. The filtrate is evaporated to dryness under nitrogen and the residue crystallized from methanol to yield 17α-(2-carboxyethyl) - 17β - hydroxyandrosta-4,6-dien-3-one lactone, M.P. 161.5–164°.

*Example 3*

To a suspension of 3 parts of 17α-acetoxy-6α-methylpregn-4-ene-3,20-dione in 15 parts of purified anhydrous dioxane is added 2.8 parts of ethylorthoformate, 0.8 part of ethanol, and 0.034 part of p-toluenesulfonic acid monohydrate. This reaction mixture is stirred for about one and one-half hours, during which time complete solution occurs, then treated with 0.04 part of fused sodium acetate and concentrated to a small volume under nitrogen. The addition of approximately 20 parts of methanol followed by cooling to about 0° results in crystallization of the product, which is collected by filtration, washed with cold methanol, and dried to yield 17α-acetoxy-3-ethoxy-6-methylpregna-3,5-dien-20-one, M.P. about 161–168°.

*Example 4*

To a solution of one part of 17α-acetoxy-3-ethoxy-6-methylpregna-3,5-diene-20-one in 44 parts of benzene is added 5 parts of manganese dioxide, and the resulting reaction mixture is stirred for about 40 minutes. The insoluble material is removed by filtration and washed on the filter with benzene. Concentration of the filtrate to dryness under nitrogen affords a crystalline residue. Fractional crystallization of this residue from methanol results in 17α-acetoxy-6-methylpregna-4,6-diene-3,20-dione, M.P. 218–220°.

*Example 5*

To a solution of 5.9 parts of 17α-(2-carboxyethyl)-17β-hydroxy-7β-methylandrost-4-en-3-one lactone in 30 parts of purified anhydrous dioxane is added 4.7 parts of ethylorthoformate, 1.2 parts of ethanol, and 0.1 part of p-toluene-sulfonic acid monohydrate; and the resulting mixture is allowed to stand at room temperature for about one hour. The mixture is treated with 0.2 part of fused sodium acetate, then concentrated to dryness on a steam bath under nitrogen. Dissolution of the residue in approximately 80 parts of methanol and cooling of the resulting solution to about 0° results in crystallization of the product, which is filtered and dried to yield 17α-(2-carboxyethyl)-3-ethoxy-17β-hydroxy-7β-methylandrosta-3,5-diene lactone. This substance displays a maximum in the ultraviolet at 241 millimicrons with a molecular extinction coefficient of 19,700, and infrared maxima at about 5.62, 6.00, 6.12, 6.81, 7.00, 7.19, 7.35, 8.36, 8.49, 8.86, 9.60, 9.80, 10.29, 10.82, 11.50, and 11.64 microns.

*Example 6*

To a solution of 10.66 parts of 17α-(2-carboxyethyl)-17β-hydroxy-6α-methylandrost-4-en-3-one lactone and 9.87 parts of ethylorthoformate in 60 parts of dioxane and 2.8 parts of ethanol is added 0.11 part of p-toluenesulfonic acid monohydrate. This reaction mixture is stored at room temperature for about 75 minutes, then treated with 0.2 part of fused sodium acetate and concentrated under nitrogen on the steam bath to a small volume. About 10 parts of methanol is added to the residual mixture and the solvent distilled. Crystallization of this residue from methanol affords 17α-(2-carboxyethyl) - 3-ethoxy-17β-hydroxy-6-methylandrosta-3,5-diene lactone, M.P. about 114–123°. This substance displays infrared maxima at about 5.64, 6.03, 6.15, 6.82, 7.21, 7.70, 7.81, 7.93, 8.52, 8.89, 9.39, 9.60, 9.82, 10.23, 10.48, 10.80, and 11.56 microns.

*Example 7*

A solution of 4 parts of 17α-acetoxy-3-ethoxypregna-3,5-dien-20-one in 140 parts of benzene is treated with 18 parts of manganese dioxide, and the resulting mixture is stirred for about 30 minutes, then filtered to remove insoluble material. This solid material is washed on the filter with benzene, and the washings added to the original filtrate. The combined benzene solutions are evaporated to dryness, resulting in a crystalline residue which is recrystallized from ethyl acetate-pentane to yield 17α-acetoxypregna-4,6-diene-3,20-dione, M.P. about 211–217°. Further recrystallization from benzene-pentane changes the melting point to about 214–217°.

By substituting an equivalent quantity of 3-ethoxypregn-3,5-dien-20-one and otherwise proceeding according to the herein-described processes, pregna-4,6-diene-3,20-dione is obtained.

*Example 8*

A solution containing 1.84 parts of 17β-acetoxy-17α-propynylestr-4-en-3-one, 1.88 parts of ethylorthoformate, 20 parts of dioxane, and 0.8 part of ethanol is treated with 0.03 part of p-toluenesulfonic acid monohydrate, and the resulting mixture allowed to react at room temperature for about 75 minutes, then neutralized with 0.05 part of fused sodium acetate and concentrated to a small volume under nitrogen. The remainder of the solvent is distilled with the aid of methanol and the residue crystallized from methanol to afford 17β-acetoxy-3-ethoxy-17α-propynylestra-3,5-diene, M.P. about 117–135°. Recrystallization first from benzene-pentane then from methanol raises the melting point to about 131–139°. This substance exhibits maxima in the infrared at about 5.72, 6.03, 6.14, 6.85, 7.22, 7.30, 7.85, 8.48, 9.69, 9.81, 10.08, 10.60, 11.03, 11.21, 11.33, 11.60, and 11.71 microns.

By substituting an equivalent quantity of 17β-acetoxy-17α-(1-butynyl)estr-4-en-3-one in the hereindescribed process, 17β-acetoxy-17α-(1-butynyl)-3-ethoxy-estra-3,5-diene is obtained.

*Example 9*

A mixture of 4.4 parts of 17β-acetoxy-3-ethoxy-17α-propynylestra-3,5-diene, 25 parts of manganese dioxide, and 700 parts of benzene is stirred at room temperature for about 30 minutes, then filtered to remove insoluble material. This solid residue is washed with benzene and the washings combined with the original filtrate. Evaporation of the solvent under nitrogen produces a residual oil which is crystallized successively from aqueous methanol, acetone-pentane, and aqueous acetone to yield 17β-acetoxy-17α-propynylestra-4,6-dien-3-one, M.P. about 189.5–191.5°. This substance possesses an ultraviolet absorption maximum at 282 millimicrons with a molecular extinction coefficient of 23,500. In the infrared it exhibits maxima at about 5.71, 6.00, 6.18, 6.31, 6.86, 7.21, 7.30, 7.50, 7.72, 7.92, 8.03, 8.40, 9.02, 9.71, 9.81, 10.30, and 11.30 microns.

The substitution of an equivalent quantity of 17β-acetoxy-17α-(1-butynyl)-3-ethoxyestra-3,5-diene in the process of this example produces 17β-acetoxy-17α-(1-butynyl)estra-4,6-dien-3-one.

*Example 10*

A solution of 4.88 parts of 21-acetoxy-3-ethoxy-17α-hydroxypregna-3,5-diene-11,20-dione in 440 parts of benzene is treated with 25 parts of manganese dioxide. The resulting mixture is allowed to react at room temperature for about 30 minutes, then filtered, and the filter cake washed with benzene. The combined filtrates are evaporated to dryness in an atmosphere of nitrogen by heating on a steam bath. Crystallization of the residue from acetone-pentane produces 21-acetoxy-17α-hydroxypregna-4,6-diene-3,11,20-trione, M.P. 214–217°. Recrystallization of this crystalline material from acetone-pentane raises the melting point to 219–222°. This substance displays an ultraviolet absorption maximum at 280 millimicrons with an extinction coefficient of 24,500, and infrared maxima at about 2.73, 2.85, 5.70, 5.80, 6.00, 6.17, 7.06, 7.17, 7.27, 7.39, 7.87, 8.03, 8.37, 8.70, 8.84, 9.02, 9.20, 9.45, 9.61, 10.18, 10.83, 11.12, 11.39, and 11.86 microns.

*Example 11*

To a solution of 5 parts of 17α-(2-carboxyethyl)-17β-hydroxyestr-4-en-3-one lactone in 25 parts of purified anhydrous dioxane is added successively 5.2 parts of ethylorthoformate, 1.6 parts of ethanol, and 0.05 part of p-toluenesulfonic acid monohydrate. This reaction mixture is allowed to stand at room temperature for about 10 minutes, then treated with about 0.06 part of fused sodium acetate and 0.15 part of pyridine. Concentration of the mixture in vacuo affords a residue which is crystallized from methanol to yield 17α-(2-carboxyethyl) - 3 - ethoxy - 17β - hydroxyestra - 3,5 - diene lactone, M.P. about 160–180°. Recrystallization from acetone and benzene-hexane raised the melting point to 164–171°. This compound displays infrared maxima at about 5.63, 6.02, 6.13, 6.83, 7.00, 7.21, 7.32, 7.55, 7.82, 8.40, 8.67, 8.97, 9.39, 9.68, 9.89, 10.22, 10.44, 10.81, 10.98, 11.30, and 11.70 microns, and a maximum in the ultraviolet spectrum at 241 millimicrons with a molecular extinction coefficient of 20,200.

*Example 12*

To a solution of 1.448 parts of 17α-(2-carboxyethyl)-3-ethoxy-17β-hydroxyestra-3,5-diene lactone in 132 parts of benzene is added 8 parts of manganese dioxide, and the resulting mixture is stirred at room temperature for about 30 minutes, then filtered, and the filter cake washed with benzene. The combined filtrates are concentrated to about 15 parts by volume, then treated with pentane to the point of turbidity. Cooling to about 0° results in precipitation of a solid which is isolated by decantation, then crystallized from methanol to afford 17α-(2-carboxyethyl)-17β-hydroxyestra-4,6-dien-3-one lactone, M.P. about 243–247°. This substance possesses an ultraviolet absorption maximum at about 281–282 millimicrons with a molecular extinction cofficient of about 26,400 and displays infrared absorption maxima at about 5.63, 6.00, 6.17, 6.30, 6.85, 7.01, 7.20, 7.31, 7.50, 7.70, 7.90, 8.36, 8.50, 8.70, 8.93, 9.41, 9.72, 9.88, 10.30, 10.82, 10.96, and 11.31 microns.

Example 13

To a solution of one part of 17β-acetoxy-3-ethoxyandrosta-3,5-diene in 66 parts of benzene is added 5 parts of manganese dioxide and the resulting mixture is stirred at room temperature for about 25 minutes. Filtration of the reaction mixture and subsequent washing of the filter cake with benzene produces a filtrate which is concentrated to dryness under nitrogen. This crystalline residue is recrystallized from aqueous methanol to yield 17β-acetoxyandrosta-4,6-dien-3-one, M.P. about 138–141°, which exhibits a maximum in the untraviolet at 283 millimicrons with a molecular extinction coefficient of 25,600. Recrystallization from acetone-pentane raises the melting point to about 140–142°.

The substitution of an equivalent quantity of 3-ethoxyandrosta-3,5-dien-17-one or 3-ethoxyandrosta-3,5-dien-17β-ol in the process of this example results in androsta-4,6-diene-3,17-dione and 17β-hydroxyandrosta-4,6-dien-3-one, respectively.

Example 14

By the substitution of an equivalent quantity of 17α-acetoxy-6-bromopregn-4-ene-3,20-dione, 17α-acetoxy-6-chloropregn-4-ene-3,20-dione, 17α-acetoxy-6-fluoropregn-4-ene-3,20-dione, 6-bromo-17α-ethynyl-17β-hydroxyandrost-4-en-3-one, 6-chloro-17α-ethynyl-17β-hydroxyandrost-4-en-3-one, or 17α-ethynyl-6-fluoro-17β-hydroxyandrost-4-en-3-one in the process of Example 1, the corresponding 3-enol ethyl ethers are obtained.

Example 15

By substituting an equivalent quantity of 17α-acetoxy-6-bromo-3-ethoxypregna-3,5-dien-20-one, 17α-acetoxy-6-chloro-3-ethoxypregna-3,5-dien-20-one, or 17α-acetoxy-3-ethoxy-6-fluoropregna-3,5-dien-20-one in the process of Example 4; 17α-acetoxy-6-bromopregna-4,6-diene-3,20-dione, 17α-acetoxy-6-chloropregna-4,6-diene-3,20-dione, and 17α-acetoxy-6-fluoropregna-4,6-diene-3,20-dione are obtained.

Example 16

The substitution of an equivalent quantity of 6-bromo-3-ethoxy-17α-ethynylandrosta-3,5-dien-17β-ol, 6-chloro-3-ethoxy-17α-ethynlandrosta-3,5-dien-17β-ol, or 3-ethoxy-17α-ethynyl-6-fluoroandrosta-3,5-dien-17β-ol in the process of Example 10 results in 6-bromo-17α-ethynyl-17β-hydroxyandrosta-4,6-dien-3-one, 6-chloro-17α-ethynyl-17β-hydroxyandrosta-4,6-dien-3-one, and 17α-ethynyl-6-fluoro-17β-hydroxyandrosta-4,6-dien-3-one.

Example 17

To a solution of 2 parts of 3,17β-diacetoxyestra-3,5-diene in 90 parts of acetic acid and 9 parts of water is added 10.5 parts of manganese dioxide, and the reaction mixture is stirred for about 2 hours, then filtered to remove the inorganic solids. The filter cake is washed with glacial acetic acid and the washings combined with the original filtrate. This organic solution is evaporated to dryness in vacuo and the residue crystallized from aqueous methanol to produce 17β-acetoxyestra-4,6-dien-3-one, M.P. 61–68°. Recrystallization from acetone-pentane affords the pure material, M.P. 108–109°. This substance displays an ultraviolet absorption maximum at 283 millimicrons with a molecular extinction coefficient of 26,700. It exhibits infrared maxima at about 5.78, 6.01, 6.18, 6.31, 6.87, 7.03, 7.19, 7.26, 7.31, 7.50, 7.72, 7.91, 8.92, 9.65, 10.30, and 11.30 microns.

Example 18

To a mixture of 2.5 parts of 17β-hydroxy-17α-(1-propynl)estr-4-en-3-one and 25 parts of isopropenyl acetate is added 0.2 part of concentrated sulfuric acid. The mixture is refluxed for 3 hours in the course of which time distillate is allowed to escape in order to remove some of the acetone formed. The mixture is then cooled to about 70°, treated with 0.5 part of sodium acetate, and the solvent is removed in vacuo. The residue is extracted with 60 parts of methylene chloride. The extract is concentrated to about 7 parts by volume and treated with 20 parts of methanol. After cooling, the precipitate formed is collected on a filter and washed with cold methanol until it is colorless. Upon drying there is obtained 3,17β-diacetoxy-17α-(1-propynyl)estra-3,5-diene of sufficient purity for use in the following procedure. Crystallization of a sample from acetone produces material melting at about 177–182°. The infrared spectrum determined in a potassium bromide disc shows maxima at about 5.71, 6.1, 7.27, 7.93, 8.2, 8.75, 8.9, 9.9, 10.1, 10.57, and 10.8 microns. An ultraviolet maximum at about 234–235 millimicrons shows a molecular extinction coefficient of about 20,000.

Example 19

To a solution of 1.5 parts of 3,17β-diacetoxy-17α-(1-propynyl)estra-3,5-diene in 70 parts of acetic acid and 6 parts of water are added 7.5 parts of manganese dioxide, and the mixture is agitated for 80 minutes. The precipitate is collected on a filter, washed with acetic acid, and then discarded. The filtrate is diluted with about 300 parts of water and the precipitate is collected on a filter and washed with water. This material is taken up in benzene and thus applied to a chromatography column charged with silica gel. The column is developed with benzene solutions containing increasing concentrations of ethyl acetate. A 3% solution of ethyl acetate in benzene yields an eluate which is concentrated, and the 17α-(1-propynyl)-17β-acetoxyestra-4,6-dien-3-one thus obtained is recrystallized from acetone and water. It melts at about 189–191°. The ultraviolet absorption spectrum shows a maximum at about 283 millimicrons with a molecular extinction coefficient of about 26,400. Infrared maxima are observed at 4.27, 4.45, 5.72, 6.01, 6.18, 6.31, 6.87, 7.30, 7.51, 7.73, 7.94, 8.93, 9.82, 10.3, and 11.3 microns.

Example 20

A solution of 6 parts of 1-butyne and 40 parts of cold ether is added portionwise in the course of 30 minutes to a solution of butyl lithium, prepared from 17.3 parts of 1-bromobutane and 2.2 parts of lithium wire in 27 parts of ether. After completion of the addition, the mixture is stirred for 90 minutes at 0°. To this solution of butynyl lithium in ether are added, in small portions in the course of about 30 minutes, 10 parts of 3-methoxy-2,5(10)-estradien-17-one in 100 parts of tetrahydrofuran. After completion of the addition, the ether is removed by heating at 55°, but the volume is maintained essentially constant by replacing the ether with tetrahydrofuran. The mixture is then refluxed for 3 hours, poured into ice water, and chilled. The oily layer is separated and dissolved in ether, and the ether solution is washed successively with water and saturated sodium chloride solution. After drying, the solution is filtered and concentrated in vacuo to yield the oily 3-methoxy-17α-(1-butynyl)estra-2,5(10)-dien-17β-ol. To a solution of the oily product in 80 parts of methanol is added a mixture of 4 parts of concentrated hydrochloric acid and 10 parts of water. The mixture is permitted to stand at 50° for 30 minutes, and then 1,000 parts of water are slowly added. On cooling, there is obtained 17α-(1-butynyl)-17β-hydroxyestr-4-en-3-one melting at about 134–137°. The ultraviolet absorption spectrum shows a maximum at about 240 millimicrons with a molecular extinction coefficient of about 17,500. Infrared maxima are observed at about 2.75, 3.38, 3.45, 6.0, and 6.16 microns.

A mixture of 5 parts of this product and 25 parts of isopropenyl acetate is treated with 0.2 part of concentrated sulfuric acid and the mixture refluxed for 3 hours with occasional distillation of the acetone formed. After cooling to room temperature, 0.5 part of sodium acetate is added and the mixture is distilled in vacuo. The residue is extracted with ether, and the ether solution washed with water, dried over anhydrous sodium sulfate, and concentrated to yield 3,17β-diacetoxy-17α-(1-butynyl) estra-3,5-diene of sufficient purity for direct use in the procedure below. Crystallization from methanol produces material of melting point about 115°–124°. Recrystallization from aqueous acetone sharpens the melting point to about 117–123°. The ultraviolet absorption spectrum shows a maximum at about 234 millimicrons with a molecular extinction coefficient of about 20,000.

The substitution of an equivalent quantity of propionic anhydride for isopropenyl acetate in the process of this example results in 17α-(1-butynyl)-3,17β-dipropionoxy-estra-3,5-diene.

*Example 21*

A mixture of 2 parts of 3,17β-diacetoxy-17α-(1-butynyl)estra-3,5-diene in 130 parts of acetic acid and 10 parts of water is treated with 12 parts of manganese dioxide, and after stirring for 2 hours the mixture is filtered and the precipitate is washed with acetic acid. The filtrate is diluted with water, and the resulting precipitate is taken up in benzene. This benzene solution is applied to a chromatography column charged with silica gel. The column is developed with benzene and benzene solutions containing increasing concentrations of ethyl acetate. Elution with a 2% solution of ethyl acetate in benzene and concentration of the eluate yields 17β-acetoxy-17α-(1-butynyl)estra-4,6-dien-3-one. The ultraviolet absorption spectrum shows a maximum at about 283 millimicrons with a molecular extinction coefficient of about 27,000. Infrared maxima are observed at about 4.4, 5.7, 6.0, 6.17, 6.3, and 8.0 microns.

*Example 22*

The reaction of 17α-(2-carboxyethyl)-17β-hydroxyandrost-4-en-3-one lactone, 17β-acetoxy-17α-propynylestr-4-en-3-one, 17α-(1-butynyl)-17β-propionylestr-4-en-3-one, or 6α-methyl-17α-propionyloxypregn-4-ene-3,20-dione with methyl orthoformate and methanol according to the procedure of Example 1 results in 17α-(2-carboxyethyl)-17β-hydroxy-3-methoxyandrosta-3,5-diene lactone, 17β-acetoxy-3-methoxy-17α-propynylestra-3,5-diene, 17α-(1-butynyl)-3-methoxy-17β-propionyloxyestra-3,5-diene, and 3-methoxy-6-methyl-17α-propionyloxypregna-3,5-dien-20-one.

*Example 23*

A mixture of 6.6 parts of 17α-ethyl-17β-hydroxyestr-4-en-3-one, 55 parts of isopropenyl acetate, and 0.1 part of concentrated sulfuric acid is heated at reflux for about 3 hours with occasional removal of the acetone formed. Approximately 0.15 part of fused sodium acetate is added, and the solvent is distilled in vacuo. The residue is extracted with chloroform, and the extract concentrated to dryness. Crystallization of this residue from methanol produces 3,17β-diacetoxy-17α-ethylestra-3,5-diene, M.P. about 100–110°, which is sufficiently pure for use in the process of the following example.

By substituting an equivalent quantity of 17β-hydroxy-17α-vinylestr-4-en-3-one in the process of this example, 3,17β-diacetoxy-17α-vinylestra-3,5-diene is obtained.

*Example 24*

To a solution of 1.5 parts of 3,17β-diacetoxy-17α-ethylestra-3,5-diene in 50 parts of acetic acid and 5 parts of water is added 5.5 parts of manganese dioxide, and the resulting mixture is stirred at room temperature for about 4 and one-half hours. The inorganic solids are removed by filtration, and the filtrate is diluted with about 500 parts of water. The resulting precipitate is collected by filtration, washed with water, and crystallized successively from aqueous methanol, methanol, and acetone-pentane to afford 17β-acetoxy-17α-ethylestra-4,6-dien-3-one, M.P. about 229–232°. It exhibits a maximum at 283 millimicrons with an extinction coefficient of 27,300, and infrared maxima at about 3.39, 3.46, 5.79, 6.01, 6.16, 6.30, 6.87, 7.28, 7.52, 7.91, 8.28, 8.58, 9.28, 9.75, and 11.32 microns.

The substitution of an equivalent quantity of 3,17β-diacetoxy-17α-vinylestra-3,5-diene in the process of this example produces 17β-acetoxy-17α-vinylestra-4,6-dien-3-one.

What is claimed is:

1. In a process for the manufacture of compounds of the structural formula

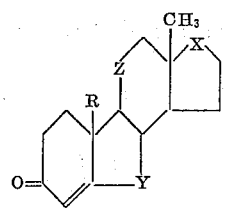

wherein R is selected from the group consisting of hydrogen and methyl radicals, X is selected from the group consisting of

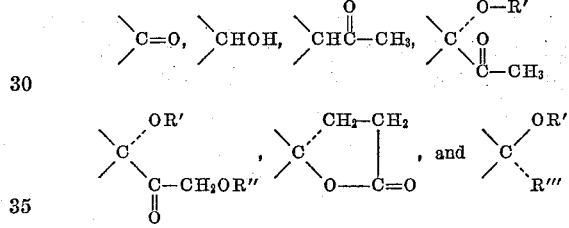

radicals; Y is selected from the group consisting of

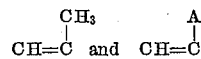

groups, wherein A is a member of the class consisting of hydrogen and halogens, of atomic weight less than 100, attached to carbon atom 6; Z is a member of the class consisting of methylene, carbonyl, and hydroxymethylene groups; R' and R" being members of the class consisting of hydrogen and lower alkanoyl radicals and R''' being a member of the class consisting of hydrogen, lower alkyl, lower 1-alkenyl, and lower 1-alkynyl radicals; the step which comprises contacting a compound of the structural formula

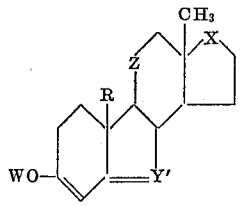

wherein W is selected from the group consisting of lower alkyl and lower alkanoyl radicals and X, Z, and R are as defined supra and Y' is selected from the group consisting of

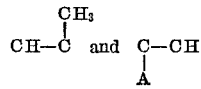

radicals, wherein A is as defined supra, with manganese dioxide in a suitable inert organic solvent.

2. The process of claim 1 in which W is a lower alkyl radical.

3. In a process for the manufacture of a compound of the structural formula

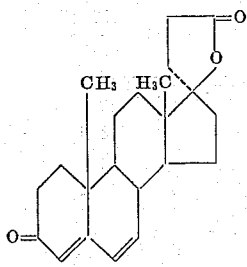

the step which comprises contacting a compound of the structural formula

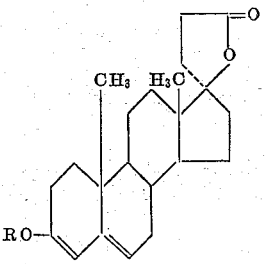

wherein R is a lower alkyl radical, with manganese dioxide in a suitable inert nonpolar organic solvent.

4. A compound of the structural formula

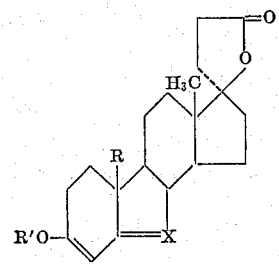

wherein R is selected from the group consisting of hydrogen and methyl radicals; R' is a lower alkyl radical; X is selected from the group consisting of

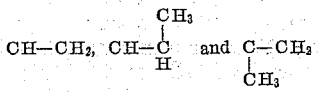

radicals.

5. A compound of the structural formula

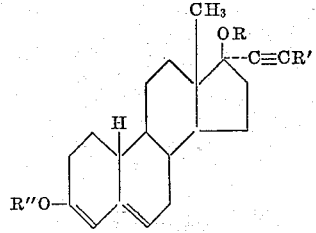

wherein R is a lower alkanoyl radical, R' is a lower alkyl radical, and R'' is selected from the group consisting of lower alkyl and lower alkanoyl radicals.

6. A compound of the structural formula

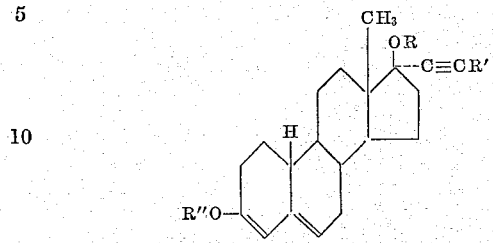

wherein R is a lower alkanoyl radical and R' and R'' are lower alkyl radicals.

7. A compound of the structural formula

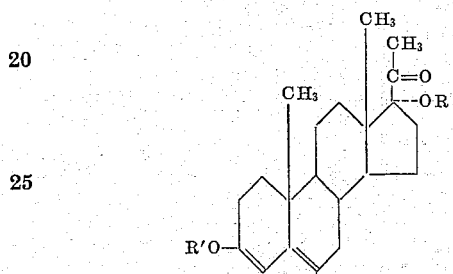

wherein R is a lower alkanoyl radical and R' is a lower alkyl radical.

8. A compound of the structural formula

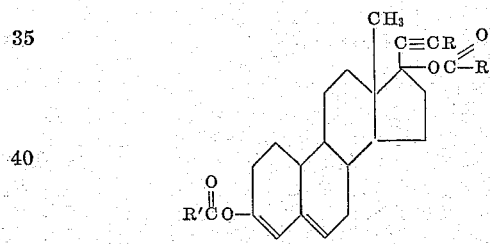

wherein R and R' are lower alkyl radicals.

9. 3,17β-diacetoxy-17α-propynylestra-3,5-diene.
10. 3,17β-diacetoxy-17α-butynylestra-3,5-diene.
11. 17α - (2 - carboxyethyl) - 3 - ethoxy - 17β - hydroxyandrosta-3,5-diene lactone.
12. 17α - (2 - carboxyethyl) - 3 - ethoxy - 17β - hydroxyestra-3,5-diene lactone.
13. 17α - acetoxy - 3 - ethoxy - 6 - methylpregna - 3,5-dien-20-one.

References Cited by the Examiner

UNITED STATES PATENTS 3,019,239    1/62    Ringold et al. _____ 260—397.3

LEWIS GOTTS, *Primary Examiner.*

LESLIE H. GASTON, MORRIS LIEBMAN, *Examiners.*

UNITED STATES PATENT OFFICE
CERTIFICATE OF CORRECTION

Patent No. 3,194,803          July 13, 1965

Frank B. Colton

It is hereby certified that error appears in the above numbered patent requiring correction and that the said Letters Patent should read as corrected below.

Column 3, lines 43 to 54, the lower portion of the formula should appear as shown below instead of as in the patent:

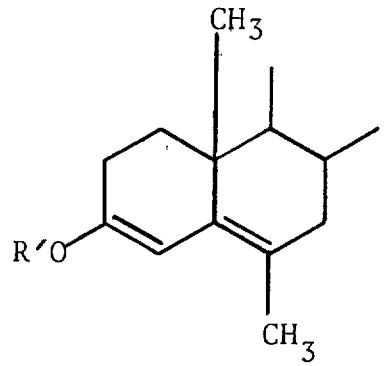

column 6, line 9, for "8.40, 9.02" read -- 8.40, 8.02 --; line 48, for "160-180°" read -- 160-168° --.

Signed and sealed this 2nd day of August 1966.

(SEAL)
Attest:

ERNEST W. SWIDER
Attesting Officer

EDWARD J. BRENNER
Commissioner of Patents